Jan. 1, 1952

L. R. HARPER 2,580,771

STEPPING REGISTER

Filed Nov. 28, 1950

3 Sheets-Sheet 1

Inventor
LEONARD R. HARPER

By A. J. Etienne

Attorney

Jan. 1, 1952

L. R. HARPER 2,580,771

STEPPING REGISTER

Filed Nov. 28, 1950

3 Sheets-Sheet 2

Inventor
LEONARD R. HARPER

By A. J. Etienne
Attorney

Jan. 1, 1952 L. R. HARPER 2,580,771

STEPPING REGISTER

Filed Nov. 28, 1950 3 Sheets-Sheet 3

Inventor
LEONARD R. HARPER

By A. J. Etienne

Attorney

Patented Jan. 1, 1952 2,580,771

UNITED STATES PATENT OFFICE 2,580,771

STEPPING REGISTER

Leonard R. Harper, Poughkeepsie, N. Y., assignor to International Business Machines Corporation, New York, N. Y., a corporation of New York Application November 28, 1950, Serial No. 197,960

17 Claims. (Cl. 250—27)

The present invention relates to an electronic stepping register and novel means for producing and controlling the stepping of the register.

More particularly the present invention relates to an electronic stepping register comprising a chain of electronic triggers as the individual components or orders of the register and novel alternating current coupling means for stepping the "on" or "off" condition of one trigger to the next trigger and thus throughout the chain of triggers until the first "on" or "off" condition of the first trigger has been stepped to the last trigger.

In computing devices, it is common practice to enter into a register a binary value or one bit of a coded value or character by selectively flipping "on" or "off" a trigger comprising an element of the register to thus, by the "on" or "off" condition of the trigger, store an indication of binary one or binary zero or by the "on" or "off" conditions of the respective triggers indicating the "yes" or "no" condition of one bit of a coded combination.

In stepping registers comprising a series of triggers, the first trigger may be flipped to indicate, for example, a binary one. Means may then be provided to either sequentially or simultaneously transfer the "on" condition of the first trigger to the next, reset the first trigger and enter another binary quantity into the first trigger. Thus by repeated entries into the first trigger and by repeated stepping of the condition of the first trigger to the second and from the second to the third, etc. each of a plurality of triggers comprising a complete register is selectively set "on" or "off," the last trigger assuming the very first condition assumed by the first trigger and the first trigger assuming an "on" or "off" condition representative of the last value entered. Thus, the combined respective indications of all the triggers of the register may indicate a plural digit binary value or by coding, can represent, in code, a value or a character.

By stopping the serial entry of values into the first trigger and by further employing the stepping means, originally employed for serial entry, the values can be read out serially in accordance with the sequential "on" or "off" conditions assumed by the last trigger of the series.

Obviously, the separate plate or cathode circuits of the tubes composing the respective triggers may be tapped for output voltages, in parallel, each indicative of the then status of the particular trigger.

One of the objects of the present invention therefore is to provide a novel electronic stepping register comprising a series of electronic triggers including novel coupling means between the triggers which cooperate in a novel manner with a regulating stepping control force to step the on or off condition of a trigger to its succeeding trigger.

Another object is to provide a novel stepping register comprising a series of electronic triggers and alternating current coupled diode means acting in conjunction with the regulating stepping control force to step the "on" or "off" condition of a trigger to its succeeding trigger.

A further object is to provide a novel stepping register employing alternating current coupled diode means and means including such diode means for coupling the last trigger and the first trigger of a series whereby a novel closed ring stepping register is provided.

Another object is to provide a novel stepping register comprising a series of electronic triggers producing control voltage conditions hereinafter referred to as a gate and means including crystal diodes and a plurality of stepping or shifting pulses hereinafter referred to as gated pulses for serially shifting the "on" or "off" indication of a higher trigger to a trigger lower in the series.

Still another object is to provide a stepping register comprising a series of electronic triggers and including alternating current coupled diodes for comparing the electrical status of a preceding and an immediately following trigger and operating said following trigger, only when its status differs from that of the preceding trigger whereby a minimum number of triggering operations are required to step along the status of any one trigger or triggers.

Another object is to provide a stepping register including a single source of stepping pulses to sharply regulate stepping of the register.

A further object is to provide in a stepping register, novel alternating current coupled diode means and varying voltages applied to opposite sides of said diode, variable in amplitude respectively to that of the other to produce stepping along at an increased rate.

Still another object is to provide a novel coupled stepping register capable of receiving and stepping simultaneously.

A further object is to provide a stepping register operative to step along at a speed closely equal to that of the speed of operation of an individual trigger.

A further object is to provide a novel coupled stepping register for stepping along binary representations of digits.

Another object is to provide a novel coupled stepping register operable at one speed for entry and storage and at another speed for read out.

A further object is to provide a novel coupled stepping register to store and represent numbers by code combinations of individual representations of the register components.

Still another object is to provide a closed ring stepping register for providing repeated cycles of groups of individual electrical manifestations, each cycle representative of a coded value or of a selected permutation of conditions.

A further object is to provide novel alternating current coupled diode column shift control means.

Other objects of the invention will be pointed out in the following description and claims and illustrated in the accompanying drawings, which disclose, by way of examples, the principle of the invention and the best mode, which has been contemplated, of applying that principle.

Figures 1, 2, 3, 4, 5:
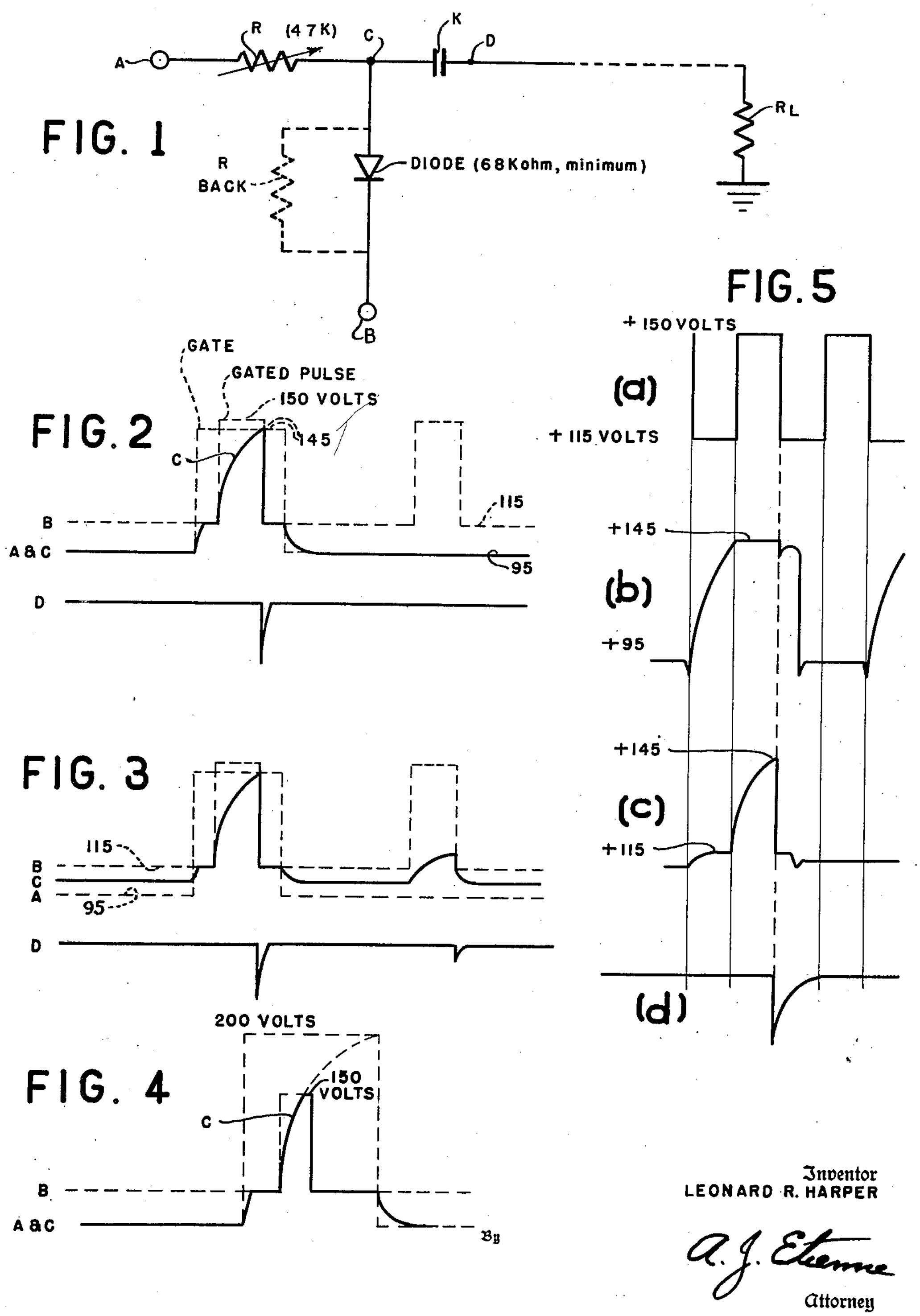
Fig. 1 is a diagrammatic illustration of the controls and diode circuit including the alternating current coupling as employed in the stepping register.
Fig. 2 is a diagrammatic illustration of the gating and gate pulses and the resultant operation of an ideal diode arranged as in Fig. 1.
Fig. 3 is a diagrammatic illustration, similar to Fig. 2, but illustrative of the operation of a commercially available diode operated under the most extreme conditions for its rating.
Fig. 4 is a diagrammatic illustration, similar to Fig. 2, but illustrating the relative maximum amplitudes of varying voltages for suitable operation at high repetition rates.
Fig. 5 is a series of four curves illustrating the operation of an alternating current coupled diode of commercial type, arranged as in Fig. 1 but employed with an electronic trigger element of a stepping register as in Figs. 6, 7, 8 and 9.

Referring to the drawings and more particularly to Fig. 1, the letter A indicates the varying voltage input, referred to as the gate pulse, applied to the plate side of a diode via a resistor R which may be variable, as shown, and may for example, be set at a value of 47K ohms (47,000 ohms) this value having been found suitable for use with a diode having 68K ohms minimum black resistance under the most critical conditions of operation and which diode may, for example, comprise a GE 1N-52 crystal diode coupled at its plate side C via a condenser K of 40 micro-microfarads, for example, to the point D comprising the output side of condenser K, connected to a load illustrated diagrammatically as $R_L$ which may comprise a low impedance load. A tube type of diode may be employed at lower frequencies. While typical values and types have been indicated, these are illustrative only and various combinations and types may be employed within the knowledge of those skilled in the art.

The cathode side of the diode is connected at B to an entry pulse or a pulse to be gated which will be referred to as a gated pulse, the relative coordination of the so-called gate pulse applied at A and such a gated pulse, applied at B, being, for an ideal diode, as indicated in Fig. 2 and for commercial type diodes, as indicated in Fig. 3. The back resistance of a non-ideal (commercial) diode is indicated dragrammatically in Fig. 1 by $R_{BACK}$. As described presently, the combined action of the gate pulse applied at A and the gated pulse applied at B produces a wave form C (Figs. 2 and 3) which, via condenser K is alternating current coupled to point D and the load $R_L$. The arrangement of the device, as illustrated in Fig. 1, lends itself to an efficient and sharply regulating alternating current coupling for controlling the stepping of triggers of a register, as described presently.

Fig. 2 illustrates diagrammatically the effect of the gate pulse applied at A of Fig. 1, and the gated pulse applied at B of Fig. 1 assuming an ideal crystal diode and idealized square waves. As is seen from Fig. 2, the gate pulse applied at A of Fig. 1, starts at A at the extreme left of Fig. 2 at a value of 95 volts, proceeds horizontally to the right as shown by the solid line, rises vertically, as shown partly by the short solid line and by the dotted line, to a maximum of 145 volts at which value it proceeds to the right horizontally and then falls vertically to 95 volts. The gated pulse applied at B, as shown at the extreme left of Fig. 2, has an initial value of 115 volts, as shown by the dotted line, proceeds horizontally to the right where it merges with the short horizontal portion of the solid line C, rises vertically (as shown by the dotted line) to 150 volts maximum, proceeds to the right horizontally and then falls vertically to 15 volts (as indicated by the solid vertical line C).

When both the gate voltage and the gated pulse voltage are down as shown at the extreme left of Fig. 2, the voltage of C is 95 volts. When the gate is applied and starts to rise, the output point C of Fig. 1 starts to rise exponentially to a value of 145 volts, as indicated by curve C in Fig. 2, but as it reaches 115 volts, it is caught by the diode, as indicated by the short horizontal portion of curve C. The gated pulse B as it starts to rise causes the output curve C to resume rising toward 145 volts, as indicated by the vertical curved portion of the solid line C. As the gated pulse decreases vertically from its maximum of 150 volts the output line C also drops vertically to 115 volts, at which level it remains, as indicated by the short horizontal portion of the line C, until the gate is removed, at which time the output at C returns exponentially to the 95 volt level.

Curve D of Fig. 2 illustrates the negative pulse produced at point D of Fig. 1 under the operating conditions just described above for Fig. 2.

If a positive pulse were desired at D, the diode would be inverted and when both the gate voltage and gated pulse voltage are down and the gated pulse rises sharply, with chosen maximum and minimum values of the gate and gated voltage the sharp rise of the gated pulse with the diode inverted will produce a plus pulse.

If the gated pulse arrives when no gate is present, as illustrated in the right hand portion of Fig. 2, the output is unaffected, as is indicated by the long horizontal portion of the solid line C remaining at 95 volts and by the absence of any negative pulse in the right hand portion of line D of Fig. 2.

Fig. 3 is generally similar to Fig. 2 but illustrates the conditions for a diode of commercial type having relatively low back resistance. With both a gate applied at point A of Fig. 1 and a gated pulse applied at point B of Fig. 1, the output as is seen from Fig. 3 is similar to that with the ideal diode, as illustrated in Fig. 2.

When no gate is applied and the back resistance is equal to that of R, in Fig. 1, namely, 47K ohms, the output will rise exponentially to 122½ volts, as indicated beneath the gated pulse with no gate, to the right in Fig. 3. Thus a small negative pulse, as indicated by the right hand portion of line D, would be produced. Such production of a small negative pulse is, however, completely eliminated, by choosing a diode whose back resistance at any operating temperature does not drop below a minimum of 68K ohms. However, if R is made variable, as indicated, and of sufficient value to prevent triggering, as described presently, by adjusting the value of R relative to the value of the back resistance, production of such a small negative pulse may be eliminated.

Still further, the conditions illustrated in Fig. 3, in addition to being eliminated by the proper selection of diode or proper selection of the ratio of R to the diode back resistance, may also be further minimized in actual operation since the back resistance of a crystal diode of the type employed does not remain constant for all voltages but increases with decreasing voltage. Therefore selection of a diode of 68K ohms minimum back resistance at the highest operative voltage will insure that no negative pulse will be produced, even if the remaining conditions upon which Fig. 3 is predicated, were to exist.

Referring to Fig. 4, this illustrates generally the conditions similar to that of Fig. 2 but illustrates the selection of the ratio of maximum values of the varying gate and gated pulse voltages which produces efficient operation at high repetitive rates. By choosing the maximum gate voltage, higher than the gated pulse voltage, a much shorter rise time for curve C is obtained with a correspondingly shorter pulse width, all as illustrated in Fig. 4, so that by variations of the respective values of the maximum voltages of the gate and gated pulse, higher repetitive rates can be obtained in each of the illustrated sets of conditions. It may be noted that under all those sets of conditions, shown in the drawings, the useful output occurs at the fall time of the pulse and is of low impedance.

Referring to Fig. 5, the four curves *a*, *b*, *c* and *d* thereof, illustrate the operation of a commercial type diode of suitably selected back resistance incorporated into a circuit utilizing a gated pulse as indicated in curve *a*, namely, maximum 150 volts, minimum 115 volts, applied at B as in Fig. 1. However, the diode circuit is incorporated into a chain of triggers, as illustrated in Figs. 6, 7, 8 and 9 in order to obtain a gate under control of trigger operation, as will now be explained.

Curve *b* of Fig. 5 illustrates the voltage conditions in a "preceding" trigger element in a register as in Fig. 6, for example, and it is to be particularly noted that in the following discussion, the gate A of Fig. 3, for example, is to be considered as replaced by curve *b* of Fig. 5, curve C of Fig. 3 is replaced by curve *c* of Fig. 5, curve D of Fig. 3 is replaced by curve *d* of Fig. 5 while curve B of Fig. 3, obviously is replaced by curve *a* of Fig. 5. The choice of a diode of minimum 68K ohms at the highest operative voltage ensures that no negative pulse is produced, in the absence of a gate.

Thus under the conditions assumed, a negative pulse, as in curve *d* of Fig. 5, will be produced, only when the relative conditions as exemplified by the curves *a*, *b* and *c* of Fig. 5 ensue in the particular chain of triggers employed and under no conditions is a negative pulse produced when no gate is applied.

Figures 6, 7:
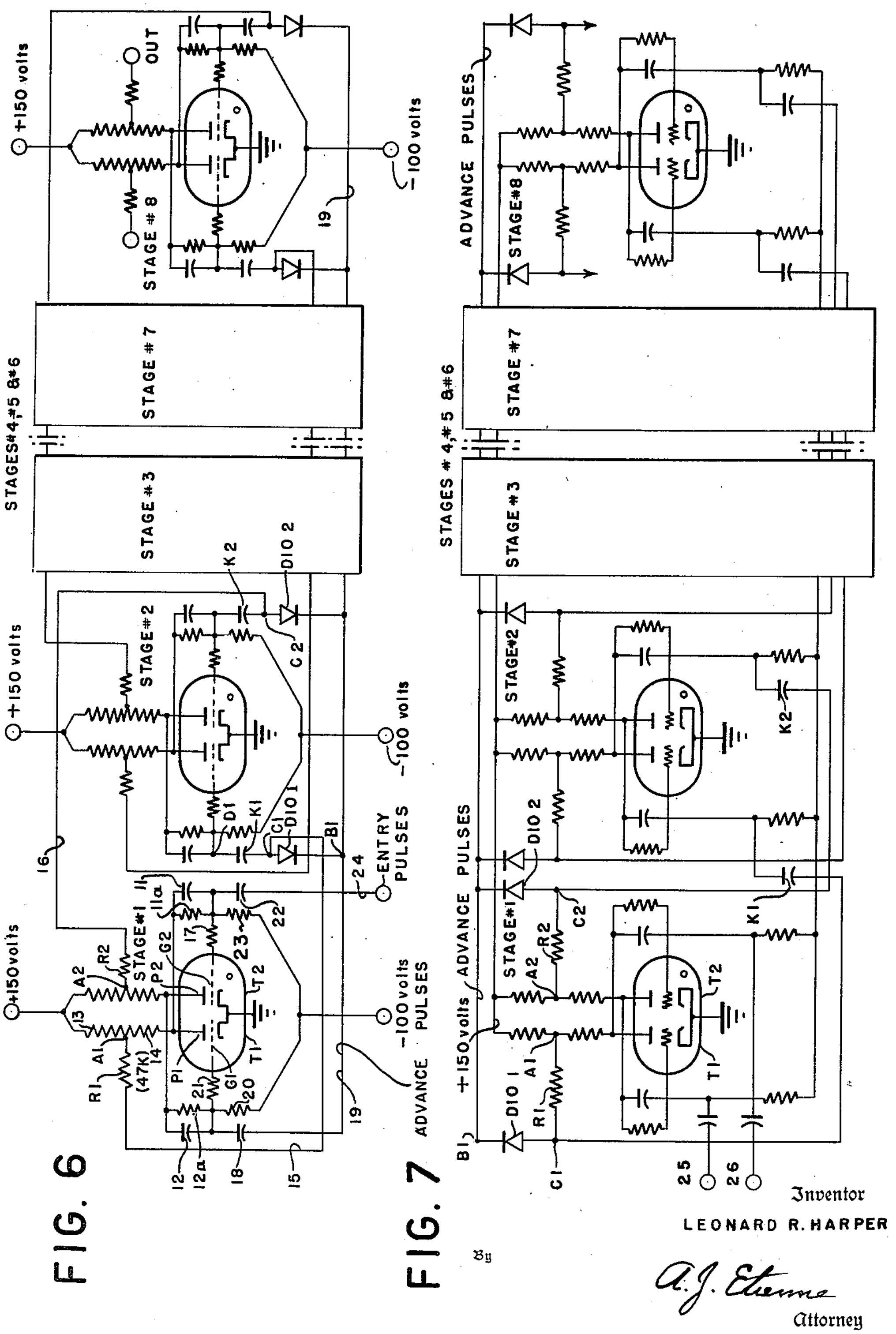
Fig. 6 is a wiring diagram, partly in block diagram form, of one embodiment of an open chain stepping register employing diode coupling as in Fig. 1.
Fig. 7 is a wiring diagram, partly in block diagram form, of a variant of the open chain stepping register as in Fig. 6.

Referring to Fig. 6 there is illustrated therein an open chain of eight triggers, certain of the triggers being indicated merely in block diagram form, and certain omitted triggers being indicated as belonging in the broken portion, in order to simplify the illustration, blocks being employed to indicate those triggers which are replicas of preceding trigger elements.

In order to high light the principle of operation, the lettering of Fig. 6 is, in part, made to conform with that of Fig. 1. Briefly, point A1 of Fig. 6 corresponds to point A of Fig. 1, resistance R1 to resistance R, point C1 to point C, diode Dio 1 of the left hand triode of the trigger of stage #2 corresponds to the diode of Fig. 1, point B1 to point B of Fig. 1, condenser K1 to the condenser K of Fig. 1 and point D1 to point D of Fig. 1.

Each of the triggers of Fig. 6 comprises, for example, a pair of cross-coupled triodes T1 and T2, the plate P1 of triode T1 being coupled by condenser 11 and resistor 11*a*, in parallel and via a grid resistor 17 to the grid G2 of triode T2 while the plate P2 of triode T2 is coupled by means of the condenser 12 and resistor 12*a*, in parallel and via a grid resistor 21 to the grid G1 of triode T1. A plate supply of 150 volts, as indicated, is applied to the plate resistors 13 and 14 of T1 which may each comprise 10K ohms, the junction of these resistors being connected to one end of the resistor R1, as indicated at A1, the other end of resistor R1 being connected via line 15 to the point C1 on the plate side of diode Dio 1 of stage #2. The plate resistors of T2 are similarly connected to the plate supply of 150 volts and at point A2 the junction of these resistors is connected to one end of resistor R2, the other end of this resistor being connected via line 16 to point C2 on the plate side of diode Dio 2 of stage #2.

The grid of T1 is connected via the grid resistor 21 to the condenser 12 and resistor 12*a*, as described above and also to one side of a coupling condenser 18 whereby the advance or shift pulses applied to line 19 are coupled to the grid G1. These advance pulses correspond to the gated pulses of Fig. 3. Resistor 21 is also connected via resistor 20 to the −100 volt bias source while the cathodes of T1 and T2 are joined and connected to ground, as shown.

The grid G2 of triode T2 is connected via the resistor 17 to the condenser 11 and resistor 11*a*, in parallel, as described above, and also to one side of a coupling condenser 22 whereby the entry pulses, applied to line 24, are coupled to the grid G2. Resistor 17 is also connected via a resistor 23 to the −100 volt bias source.

As an initial starting condition, it is assumed that the right hand triodes of each of the eight trigger stages are conducting or in other words, that all the triggers are "off." Entry pulses (digit input pulses) applied via the line 24 and condenser 22 are so timed with respect to the advance pulses and with regard to the resolving time of the triggers that the advance pulses fall between the entry pulses and all the pulses are so separated, in time, that the trigger of the first tage will be flipped by the entry pulse, if so required, and will assume its stable state before an advance or shift pulse is applied. Similarly the digit input pulses are so delayed, in time, with regard to the shift pulses, that time is allowed for the first stage, if just reset, to recover and be ready for setting again.

A series of digit impulses may be applied to the entry line 24 in any well known manner, the presence of such a digit pulse indicating a binary one or, if coded, an operative or "yes" state of the code bit, while absence of a pulse indicates either a binary zero or if coded, an inoperative or "no" state of the code bit. Thus a series of eight pulses or no pulses, equal to the eight stages, will load the register, either as an eight digit binary number or as a quantity or identity represented by an eight element code.

As any one pulse is applied via line 24, the negative portion flips the trigger of stage #1 so that triode T2 will now be non-conducting and T1 will now conduct or in other words the trigger of stage #1 is flipped "on" and a binary one is stored therein.

With the trigger of stage #1 "on," point A1 is at approximately 95 volts and point A2 at approximately 145 volts. The voltage at A1 is applied via the resistor R1 and line 15 to the point C1 on the plate side of diode Dio 1 of stage #2. Condenser K1 connected to point C1 charges to the voltage at A1.

Tracing the circuit from point A2 via resistor R2 and line 16 to point C2, it is obvious that condenser K2 will charge to the voltage of point A2.

When the advance pulse line is at 150 volts there will be no conduction through either the diode Dio 1 or Dio 2 since the plate sides of both diodes will be negative (95 volts and 145 volts respectively) with respect to their cathode sides (150 volts).

However, when the advance pulse falls to 115 volts, as indicated, for example, in curve *a* of Fig. 5, the cathode of diode Dio 1 is still at a higher voltage (115 volts) than its plate (95 volts) and it does not conduct. Diode Dio 2, however, will conduct, since its plate side is at 145 volts while its cathode side reduction towards 115 volts is being initiated, as shown in Fig. 3. The condenser K2 when the diode so conducts, and as is seen from curve *d* of Fig. 5, couples the negative pulse to the grid G2 of the right hand triode of stage #2. Thus stage #2 will go "on" and since at the same time the advance pulse is being applied to the grid G1 of the left hand triode of stage #1, this stage is returned to its "off" condition (see curve *b* of Fig. 5).

If the next entry is to be a binary zero, no gated pulse (entry pulse) is applied via the entry line 24 to the grid G2 of triode T2 of stage #1, so that stage #1 remains "off." In this condition, the voltage at point A1 is 145 volts while that at point A2 is 95 volts. Thus, when the advance pulse falls to 115 volts, the diode Dio 1 will have a voltage of 145 volts on its plate and 115 volts on its cathode so that this diode will conduct and stage #2 will be flipped "off," similar to the now condition of stage #1.

If this next entry pulse had been a binary one instead of a binary zero, stage #1 would have been flipped "on," again, and the diode Dio 2 would have had 115 volts on its cathode and 145 volts on its plate and thus the diode Dio 2 would have become conductive again to apply a negative pulse to the grid G2 of the right hand triode of the second stage. However, since, at this time, the right hand triode would have been already non-conducting, no flipping of stage #2 would have been necessary or would have occurred.

Thus, it is seen that the alternating current diode coupling illustrated is effective to flip and does so flip a succeeding trigger, when and only when its preceding trigger is in a different status. On the other hand when the two triggers are in the same status, so that no flipping of the succeeding trigger is required, no flipping ensues.

In a similar manner, the status of stage #2 will be transmitted to the trigger of stage #3, etc. until the eight triggers of the complete register are loaded.

At this time the entry pulses may be discontinued and application of a series of advance pulses will step the register to the right, an output being obtained indicative respectively of the status of the #8, #7, etc., #1 stages, respectively, as eight advance (stepping) pulses are applied.

Thus, it is seen that a simple efficient stepping of digits or bits of code is obtained in loading a register and that, when loaded, the digits may be stepped again, out of the register.

Referring to Fig. 7, the device illustrated therein is very similar to that of Fig. 6, similar elements thereof being similarly labeled to tie in the description of Fig. 6 so it applies, without further comment, to Fig. 7. In the device of Fig. 7, however, negative pulses are applied via input 25 to the grid G1 of the extreme left hand triode to enter a binary zero while a negative pulse will be applied via input 26 to the grid G2 to enter a binary one. Otherwise the operation is similar to that of the device of Fig. 6.

Figure 8:
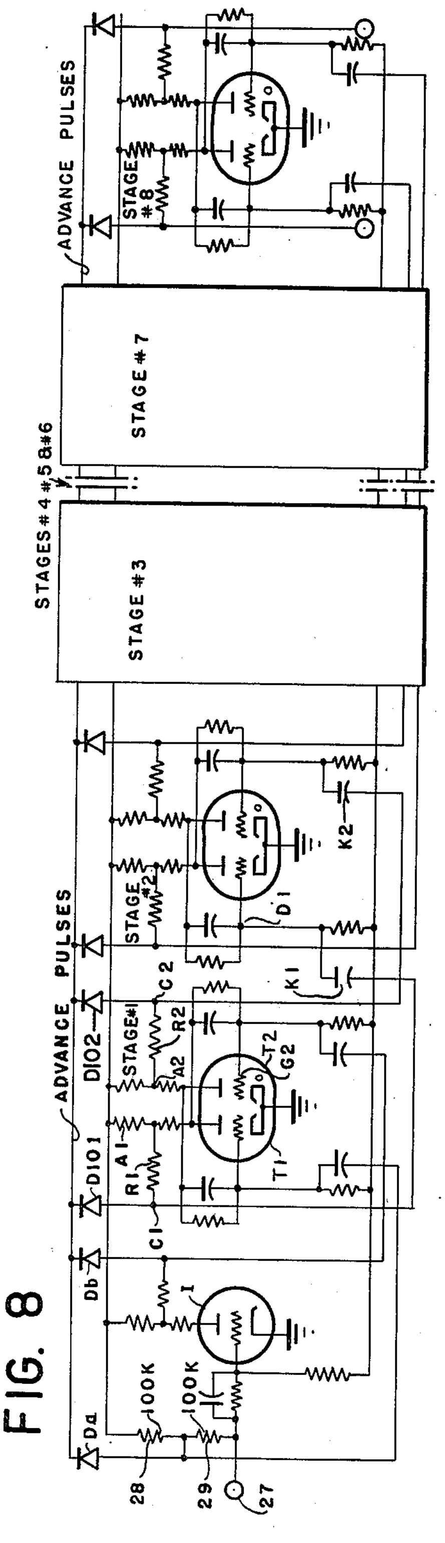
Fig. 8 is a wiring diagram, partly in block diagram form, of another variant of the open chain stepping register of Fig. 6.

Fig. 8 illustrates a variant in which the entry pulses and the advance or shift pulses are applied simultaneously.

Application of a relatively negative voltage level to line 27 will as described presently apply a negative level to the plate side of diode D*a* and at the same time a positive level to the plate side of the diode D*b*, respectively. In this embodiment, the value of the control resistor has been approximately doubled and used as a voltage divider comprising resistors 28 and 29 each approximately twice the value of R1. By means of this voltage divider, a relatively negative voltage level is applied via resistor 29 to the plate of diode D*a*. The inverter triode I has a conventional tap and control resistor, as indicated by R1.

Since, as stated above, application of a relatively negative voltage level to input 27 will apply a negative level to the plate side of diode D*a* and at the same time a positive level to the plate side of diode D*b*, only diode D*b* will conduct, at the fall of the advance line, applying a negative pulse to the grid G2 of the right hand triode of the #1 stage, flipping this trigger on, to thus store a binary one.

Assume for example, that condition in the operation of the register when the first stage is already "on" and a binary one indication is applied to the input 27, as just stated. Since stage #1 is already "on," the trigger of the first stage is not altered by the advance pulse. However, with this stage #1 "on," the diode Dio 2 of this stage will conduct when the advance pulse is applied, so that stage #2 will be flipped on to indicate the binary one, previously entered in stage #1. Stage #1, as previously stated, remains unaltered since it is already "on," indicating a binary one storage condition.

Figure 9:
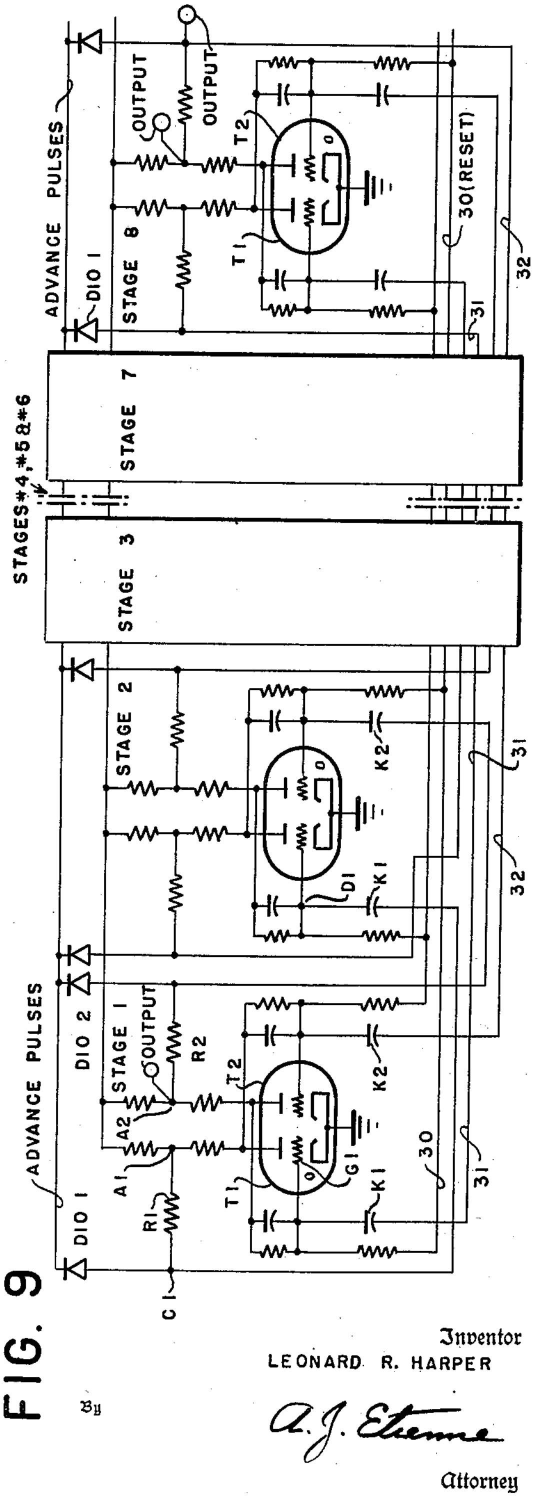
Fig. 9 is a wiring diagram, partly in block diagram form, of a closed ring embodiment of a stepping register employing diode coupling as in Fig. 1.

Fig. 9 illustrates a closed ring embodiment of the invention. In this embodiment, the eight binary numbers or eight bits of a coded quantity may be first entered, for example, by selectively resetting the individual triggers. As exemplary of such reset means, a relatively positive voltage is applied to the reset line 30 which will reset the first trigger, at the extreme left in Fig. 9, to the "on" condition while the last trigger at the extreme right, is reset "off," as indicated. The intermediate triggers #2 to #7, respectively, can be selectively set in any desired pattern.

Instead of employing the reset line, which is shown as illustrative only of one means of loading the register, any well known method of selectively setting the triggers "sidewise" for example, may be employed and further any of the means described above, for serial entry to the respective triggers may be employed to thereby load the stepping register in eight steps.

Once the binary numbers or coded quantity is entered, the device of Fig. 9 can be employed under control of the advance pulses so that the plates by means of the taps marked "output" and including the plate of the last trigger, supply repeatedly, to other storage or computing means, the complete binary number or the coded quantity stored in the stepping register. This can be supplied serially by means of the output of the last trigger or in parallel by means of all the plate outputs and in combinations of serial and parallel by use of the advance pulses or by static potential read out of all the plates after loading. The operation of the alternating current coupled diode is as described in connection with Fig. 7, for example, the digits stored in the first trigger, on the extreme left, being transfered to the trigger to its immediate right, etc. By means of lines 31 and 32, the digit stored in the last trigger will also control the entry of the digit into the first trigger, after the register has been loaded, as described above, and the register is being operated solely under control of the advancing pulses. For example, assume that at any chosen time, the last trigger is "off" with its triode T2 conducting while its triode T1 is non-conducting while the first trigger, at the extreme left, is "on," with its triode T1 conducting and its triode T2 non-conducing, all as illustrated in Fig. 9.

Upon application of an advance pulse, the diode Dio 1 of the last trigger will conduct applying a negative pulse via line 31 to the grid of G1 of triode T1 of the first trigger, at the extreme left, to flip this trigger "off" to thereby store in the first stage the digit previously stored in the last stage. Thus a closed ring operation is provided whereby wave forms and voltage indications of the quantity originally entered to load the stepping register can be repeatedly supplied to another register, computing device or recording medium or any device to be controlled in accordance with the pattern originally stored in the stepping register.

While the triggers have been illustrated as cross coupled triodes, obviously cross coupled pentodes and other types of triggers may be employed in conjunction with the novel diode alternating current coupling means disclosed.

While there have been shown and described and pointed out the fundamental novel features of the invention as applied to a plurality of embodiments, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a coupling device including a diode, a source of changing potential, means including a variable resistor for applying said potential to one electrode of said diode, the value of said resistor being adjustable to approximately seven tenths of the minimum back resistance of said diode, a second source of changing potential, means for applying said second potential to the other electrode of said diode and means including a capacitor for delivering an operating voltage upon assumption of similar extremes of value by both said potentials followed by a change in the value of one of said varying potentials.

2. In a coupling device including a diode, a source of varying potential comprising an operable electronic trigger, means for operating said trigger, means including a resistor for applying a potential from said trigger to one electrode of said diode, a source of varying control potential, means for applying said control potential to the other electrode of said diode, means including a capacitor connected to an electrode of said diode for delivering an operating voltage upon a change in the value of said control voltage.

3. In a coupling device including a diode, a source of varying potential, means including a resistor for applying said potential to one electrode of said diode, a second source of varying potential, means for applying said second potential to the other electrode of said diode, means including a capacitor connected to an element of said diode for delivering operating voltages, and means for varying the relative maximum amplitudes of said two varying potentials whereby the repetition rate of said operating voltages may be altered.

4. In a coupling device including a diode, a source of varying potential, a resistance capacitance network, means connecting said source to one end of said network, means connecting one electrode of said diode intermediate said resistance capacitance network, a second source of varying potential, and means applying said second potential to the other electrode of said diode whereby an output is obtained at the other end of said resistance capacitance network under control of said varying potentials.

5. A stepping register comprising a series of bistable trigger elements, means for connecting said trigger elements in cascade and including an alternating current coupled diode and means for stepping the electrical "on" or "off" condition of one triggger element to a succeeding or succeeding trigger elements comprising a source of varying potential and means for applying said potential to one electrode of all of said diodes.

6. A stepping register comprising a series of electrically bi-stable triggers, means for connecting said triggers in cascade, means for entering a quantity into the first trigger of the series by selectively controlling the adopted setting of said first trigger to an "on" or "off" condition, if required by said entry, means for stepping, at one speed, the electronic "on" and "off conditions of said first trigger to the next trigger and through said series until all triggers have been selectively set in accordance with a series of values equal to the number of triggers and means for stepping the entered values of the series of triggers out of said series, at another speed of stepping.

7. A stepping register comprising a series of electrically bi-stable triggers, means for connecting said triggers in cascade, means for entering a value into the first trigger of the series by selectively setting the trigger "on" or "off," if so required by a first entry, diode means comparing the electrical status of said first trigger and that of the next succeeding trigger, and means including said diode means for stepping the "on" or "off" condition of said first trigger to said second trigger, only if the respective trigger "on" and "off" status differ, and diode means for each of the pairs of triggers, including said second trigger, for similarly stepping the "on" and "off" conditions from a preceding trigger to the succeeding trigger.

8. A stepping register comprising a ring of bistable trigger elements, means for connecting said elements in cascade and including a diode alternating current coupled between successive elements, means for setting the first of said cascaded elements to an "on" or to an "off" condition and means including a varying source of potential applied to all of said diodes, for stepping said "on" or "off" condition, respectively, to successive elements, each succeeding element being flipped only upon disparity of "on" or "off" conditions existing between contiguous trigger elements, and means including alternating current diode coupling between the last trigger of the series and the first trigger of the series to close the ring of triggers.

9. A stepping register comprising a series of electronic triggers, means for connecting said triggers in cascade and including a diode, alternating current coupled to each of the control elements of all triggers, except the first, and means connecting an output circuit of each preceding trigger, including said first trigger, to one electrode of each of the diodes of the succeeding trigger.

10. A stepping register comprising a series of electronic triggers each comprising a pair of electron emitting tubes, means for connecting said triggers in cascade and including a diode, alternating current coupled to each of the grids of all the tubes, except those of the first trigger, means connecting the plate circuit of one tube of said first trigger to the plate of the diode coupled to the grid of the corresponding tube in the second trigger, means connecting the plate circuit of the other tube of said first trigger to the plate of the diode coupled to the grid of the corresponding tube in said second trigger, and tube plate to diode plate connections between the plates of each tube of each trigger including said second trigger and each of the succeeding triggers.

11. A stepping register comprising a series of electronic triggers, each comprising a pair of electron emitting tubes, means for connecting said triggers in cascade and including diodes, each connected at a first electrode to one end of a resistor and the other end of said resistor connected to the plate circuit of each tube of each trigger, means for applying a repeated voltage to the other electrode of each of said diodes, means coupling said first electrode of the diode of one tube of the first trigger of the series to the grid of the corresponding tube of the next trigger in the series, and means coupling said first side of the diode of the other tube of the first trigger of the series to the grid of the corresponding tube of the next trigger in the series, said last two coupling connections being repeated for each trigger and its succeeding trigger whereby a value entered in said first trigger is stepped to succeeding triggers by said repeated voltage.

12. A stepping register as in claim 11, said first trigger being preceded by a triode including a tapped plate resistor, a resistive connection between said tap and the plate side of a diode, an input to the grid of said triode and a voltage divider comprising a pair of joined resistors connected at one end of one resistor to the plate circuit of said triode and at one end of the other resistor to said grid, and another diode connected at its plate side to the junction of the resistors forming said voltage divider, the cathodes of said last two diodes being connected to said source of repeated voltage and means coupling said plate of said last diode to the grid of the first tube of said first trigger.

13. A stepping register comprising a series of triggers, each comprising a pair of first and second cross coupled tubes, means connecting said triggers in cascade and including a diode for each tube of each trigger, connected at its cathode side to a source of varying potential and at its plate side connected to one end of a resistor, the other end of said resistor being connected to the plate circuit of the tube associated with the diode, means coupling the plate side of the diode of the first tube of the first trigger of the series, to the grid of the first tube of the second trigger of the series, means coupling the plate side of the diode of the second tube of the first trigger to the grid of the second tube of the second trigger, means similarly coupling the plate side of each diode to the grid of the corresponding tube of each succeeding trigger, means coupling the plate side of the diode of the first tube of the last trigger to the grid of the first tube of the first trigger of the series, and means coupling the plate side of the diode of the second tube of the last trigger to the grid of the second tube of the first trigger, whereby a closed ring, diode coupled stepping register is provided.

14. A stepping register comprising a ring of triggers each comprising a pair of cross-coupled tubes and each tube including an output, a diode for each tube connected at one electrode to a source of repeated varying potential and at its other electrode via a resistor to the output of its corresponding tube, and means coupling said other electrode of each diode to the grid of the corresponding tube of the next succeeding trigger in the ring, means for selectively tripping or non-tripping the triggers of said ring whereby a series of values are represented by the respective "on" or "off" conditions thereof, said varying potential and the "on" or "off" conditions of each trigger applying potentials to the opposite sides of said diodes whereby the "on" or "off" conditions of one trigger is transferred to a succeeding trigger upon an application of said repeated voltage and the "on" or "off" condition thus assumed by said succeeding trigger is transferred to its succeeding trigger upon another application of said repeated voltage etc. until after repeated applications of said voltage equal to the number of triggers, the series of values entered into said triggers are individually successively entered into successive triggers up to and including the last trigger of said series and then to the first trigger.

15. A device as in claim 14, said series being formed into a closed ring by intercoupling the diodes of the last trigger and the grids of the first trigger.

16. A device as in claim 15, and taps in the outputs of corresponding tubes of each of said triggers, whereby a series of voltage conditions representative of the "on" or "off" condition of each trigger can be obtained from each of said triggers, serially, during said stepping, or in parallel, at the end of stepping.

17. A device as in claim 15, said closed ring of triggers being continuously stepped by said repeated voltage changes, whereby said taps present a repeated series of voltage conditions indicative of the respective "on" or "off" conditions assumed at any step by said series of triggers.

LEONARD R. HARPER.

REFERENCES CITED

The following references are of record in the file of this patent:

UNITED STATES PATENTS

| Number | Name | Date |
|---|---|---|
| 2,478,683 | Bliss | Aug. 9, 1949 |
| 2,536,808 | Higinbotham | Jan. 2, 1951 |